United States Patent [19]

Hansen

[11] Patent Number: 5,045,843

[45] Date of Patent: Sep. 3, 1991

[54] OPTICAL POINTING DEVICE

[75] Inventor: Per K. Hansen, Burlington, Vt.

[73] Assignee: Selectech, Ltd., South Burlington, Vt.

[21] Appl. No.: 280,509

[22] Filed: Dec. 6, 1988

[51] Int. Cl.[5] .......................... G09G 3/02; H04N 5/44
[52] U.S. Cl. .................................... 340/709; 340/706; 340/707; 358/194.1; 359/142
[58] Field of Search ............... 340/709, 710, 706, 707; 356/375; 358/194.1; 455/603

[56] References Cited

U.S. PATENT DOCUMENTS 4,682,159  7/1987  Davison .............................. 340/709

FOREIGN PATENT DOCUMENTS 0230228  11/1985  Japan .................................. 340/707

Primary Examiner—Alvin E. Oberley
Assistant Examiner—Xiao Min Wu
Attorney, Agent, or Firm—Fleit, Jacobson, Cohn, Price, Holman & Stern

[57] ABSTRACT

The present invention relates to an optical pointing device which preferably uses infrared light as a source and a camera as a detector. Movements of the camera with respect to the light source which remains fixed are sensed in the detector portion of the camera to determine the direction in which the camera is pointing with respect to, for example, a display screen adjacent the light source. The electronics included in the present invention are designed to act, responsive to sensing of the position of the camera with respect to the light source to cause corresponding movements of a cursor on the display screen. Other modes of operation of the present invention are also disclosed.

18 Claims, 12 Drawing Sheets

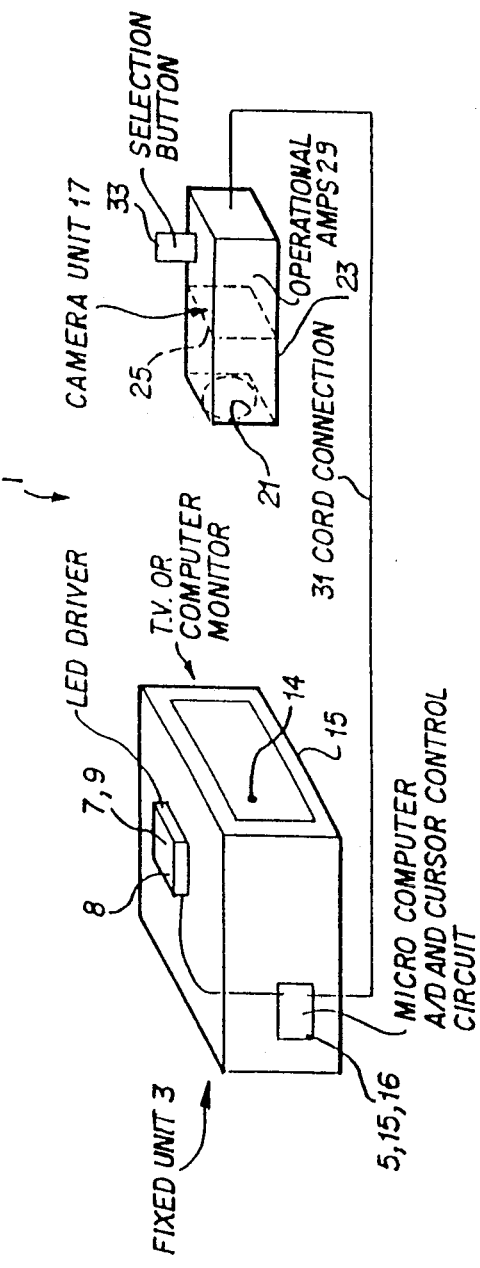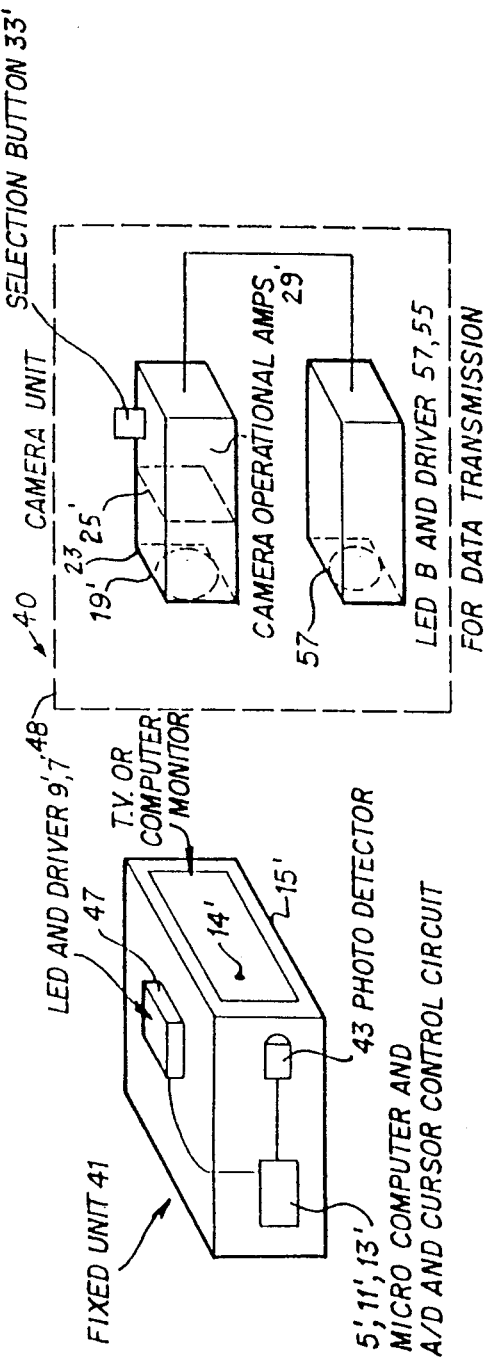

OPTICAL POINTING DEVICE

BACKGROUND OF THE INVENTION

The present invention relates to an improved optical pointing device. Applicant wishes to incorporate by reference applicant's prior U.S. Pat. No. 4,576,481 as well as applicant's prior co-pending application Ser. No. 06/704,526 filed Feb. 22, 1986, now U.S. Pat. No. 4,823,170 which has been allowed by the United States Patent and Trademark Office but has not, as of the date of filing of this patent application, issued as a United States Patent.

U.S. Pat. No. 4,576,481 discloses a system which is designed to measure the position of a retro-reflector in three dimensions X, Y and Z by using at least one retro-reflector and a least two position sensing detectors. The present invention differs from the teachings of this patent for many reasons. The present invention uses only one camera, whereas the patent requires the use of at least two position sensing detectors. Further, the present invention teaches cursor control simply by aiming a pointer at that point on a display screen to where the user wishes the cursor to move. No such cursor control is taught in the patent. Furthermore, the present invention teaches two way communication which is nowhere taught or suggested in the patent.

Further, the present invention uses a camera attached to a moving object and does not use retro-reflectors, whereas, the patent utilizes attachment of a retro-reflector to a moving object. Finally, the present invention includes active dynamic gain control and adjustable rotation angles, features nowhere taught or suggested in the patent.

U.S. patent application Ser. No. 06/704,526 discloses a system which uses a focusing retro-reflector used to move a cursor on a screen wherein the focusing retro-reflector is attached to a moving body. The present invention is distinct from the teachings disclosed in this patent application in several respects. The present invention does not use a focusing retro-reflector, allows the use of a large work area, includes the concept of two way communication, utilizes a camera attached to a moving object and utilizes a direct transmitted light signal in operation. Contrary to these aspects, the co-pending patent application uses a focusing retro-reflector in a limited work area, does not teach or suggest two way communication, teaches the attachment of a focusing retro reflector to a moving object and teaches reflecting of a light beam off the focusing retro-reflector to a receiver close to the transmitter. Furthermore, the present invention teaches adjustable rotation angles and active dynamic gain control, features nowhere taught or suggested in the co-pending patent application.

As such, the present invention constitutes an improvement over the teachings of applicant's prior patent and co-pending patent application.

The following prior art is known to applicant:

U.S. Pat. No. 4,565,999 to King et al discloses a cursor control system which includes a radiation source and an associated radiation sensor with one of the source or sensor being fixed with respect to a display while the other is movable and may be fixed to the head of the user. The radiation source is disclosed as including four led's each of which covers a 90 degree angle. The present invention is distinct from the teachings of King et al in several respects. The present invention uses only one source of light whereas the King et al device utilizes a plurality of sources which are sequentially excited. The King et al sources cover partially overlapping angular segments. Since the present invention only requires a single source, partially overlapping angular segments are not required. Furthermore, the King et al patent teaches the requirement of amplitude detection whereas the present invention does not require measurement of amplitude of received light in order to determine the line of pointing. Furthermore, King et al do not use position sensing detectors whereas the present invention uses such a device. Further, the present invention teaches the concepts of two way communication, adjustable rotation angles and active dynamic gain control, none of which are taught by King et al. Furthermore, King et al teach the use of two configurations, one of which measures mostly rotation and the other of which measures mostly translation. The two systems are combined to form a system mostly sensitive to rotation whereas the present invention teaches only one configuration either sensitive to rotation or translation. Finally, the present invention does not require any predetermined operator head motions whereas the King et al teaches the need for suppressing particular operator head motions. As such, for these reasons, it is clear that the present invention patentably distinguishes from the teachings of King et al.

U.S. Pat. No. 3,706,493 to Redmann discloses the concept of a ranging and aiming system for determining the position of a source which emits a continuous or noncontinuous radiation beam. The system requires at least two optical systems whose axes are separated by a known distance. This is different from the teachings of the present invention wherein only a single sensor is required. Redmann relies upon a triangulation principle which is not used in the present invention. Finally, Redmann teaches the use of phosphor image directing tubes which are not required in the present invention. Redmann fails to teach cursor control while this is U.S. Pat. No. 3,907,434 to Coles discloses a binaural sight system which is designed to produce a binaural sound representative of the location of a visible object with respect to a listener. The device includes means for generating first and second time related signals at an audible frequency and a head set including two independently operable earphones which are connected to the signal generating means. This is different from the teachings of the present invention since the present invention only requires a single sensor whereas Coles requires two sensors and uses the triangulation principle which is not required in the present invention. Furthermore, Coles teaches the use of scanning circuitry as well as output of audible signals, concepts not used in the present invention. Coles does not teach or suggest control of a cursor on a display as does the present invention.

U.S. Pat. No. 4,123,165 to Brown teaches a device for remote determination of the attitude of a vehicle which uses two separate arrays of corner cube retro-reflectors. As has been noted above, the present invention utilizes direct line of sight detection without the use of retro-reflectors. Furthermore, Brown et al require the use of two detectors whereas the present invention only requires a single position sensing detector. Brown et al fail to teach control of a cursor on a display as is included in the teachings of the present invention.

U.S. Pat. No. 4,209,255 to Heynau et al discloses an aiming point locating system having a single led mounted on the helmet of a pilot in an aircraft which can be used to designate a point on a cockpit display without touching the display. The Heynau et al device uses four separate position sensing arrays placed around the display to facilitate position detection. This is different from the teachings of the present invention wherein only a single source of light and a single position sensing detector is required.

U.S. Pat. No. 4,320,462 to Lund et al discloses a high speed laser pulse analyzer including the use of a laser pointed at a detector array and designed to detect relative position and divergence of the laser beam. This is different from the teachings of the present invention wherein infrared light is employed in a system designed to determine the angular relationship between a moving camera and a fixed source of light.

U.S. Pat. No. 4,396,945 to DiMatteo et al discloses a method of sensing the position and orientation of elements in space which includes the use of two cameras, a servo and wherein the triangulation principle is used. Furthermore, DiMatteo et al require the use of lights of differing colors. The present invention is distinct from the teachings of this patent as using only a single position sensing detector and thereby not requiring the use of triangulation principle. Furthermore, the present invention only requires a single light source. Finally, the present invention teaches control of the position of a cursor which is nowhere taught or suggested by DiMatteo et al.

U.S. Pat. No. 4,626,892 to Nortrup et al discloses a television system with a menu-like function control selection wherein a menu may be displayed on the screen of the television and pushing of different buttons on the remote control results in cycling through the menu to facilitate control of the television. In Nortrup et al, the remote control is always aimed at the same location on the television where signals are to be received. This is different from the teachings of the present invention wherein the angular relationship between a camera worn by the user and a single fixed source of light is used in moving a cursor on a display screen.

U.S. Pat. No. 4,660,981 to Stridsberg discloses a method and apparatus for calibrating a positioning system which includes a control means for sending command signals to a positioning apparatus intended during a working state to locate an object with respect to an operating area. Stridsberg uses holes in a detector plate with multiple detectors placed beneath the holes as well as motors and rotating mirrors. Furthermore, Stridsberg requires the use of known angles and fails to teach any structure for controlling the position of a cursor. In contrast to this, the present invention only requires a single source of light and a single detector without the use of (1) motors and rotating mirrors or (2) a detector plate with holes and a plurality of detectors associated therewith.

U.S. Pat. No. 4,641,205 to Beyers describes a system contained within a television or VCR which is used in conjunction with an on screen programming scheme. The Beyers system does not use a pointing device but, rather, uses function buttons on a standard infrared remote control device. While the present invention may include the concept of onscreen programming, the sensor would be at the location of the user rather than vise versa as would be the case in the Beyers device.

U.S. Pat. No. 4,684,249 to Ellis discloses the concept of an angular position sensing device including three spaced linear photo detector arrays fixed to an aircraft and a single light source mounted on the helmet of the user. This is different from the teachings of the present invention wherein a single detector may be mounted on the head of the user and a single source of light is mounted adjacent, for example, a display screen. Furthermore, Ellis teaches the need for a time reference sensor placed on the user's body as well as a source which has a cyclic sweeping motion including the use of a motor and rotating mirrors. Of course, the present invention does not require a time reference sensor nor does it include any moving parts.

U.S. Pat. No. 4,701,047 to Eibert et al discloses line selection for preparing range images wherein the system scans an object on a line by line basis and range images are thereafter calculated based upon the triangulation principle. Eibert et al also measure reflections and require a decoder in the receiver section. The present invention is distinct from the teachings of Eibert et al in that the present invention does not require triangulation, the present invention does not measure reflection, the present invention does not use a scanning technique and does not use decoders. Furthermore, the present invention teaches controlling of the position of a cursor on a display which is not taught or suggested by Eibert et al.

U.S. Pat. No. 4,745,402 to Auerbach describes a system which allows the user to move a cursor on a screen by moving a remote unit wherein the system measures the received phase of transmitted phase encoded signals. Auerbach uses a plurality of sources in a special angular and physical arrangement as well as a complex phase detection scheme. The present invention is distinct from the teachings of Auerbach as using only a single source, as simply pulsing the single source rather than using phase encoded signals, as not requiring phase detection and as using a single position sensing detector. Furthermore, the present invention teaches two way communication, adjustable rotation angles and active dynamic gain control, concepts nowhere taught or suggested by Auerbach.

Furthermore, Auerbach discloses further distinction of the King et al reference from the teachings of the present invention At Column 1, line 51 through Column 2, line 7 the King et al system is discussed. In this discussion, the following is stated:

"Thus a system using amplitude modulated signals encounters difficulty in preserving the amplitude-proportionality of the samples, through the detection, preamplification, sampling and holding processes. Requiring the system to operate over the aforementioned distances, places severe linearity and stability constraints on the receiver circuitry. Any non-linearity at the higher signal amplitudes (short distances) or instability at the lower signal amplitudes (long distance) will degrade the ability of the system to accurately convey user "pointing" information to its destination." This further distinguishes the teachings of the present invention from King et al as should be understood from the detailed discussion set forth hereinabove.

SUMMARY OF THE INVENTION

The present invention fulfills a need which has developed of late for a system allowing easy control of a cursor on a screen. Such a system may have important and effective application in controlling a programming menu on a television set. Televisions and VCRs are now manufactured including circuitry allowing a menu to be displayed on a television screen, which menu is manipulated through the use of an infrared remote controller device to allow a VCR or television set to be preprogrammed.

As such systems are presently known, the user must manipulate the remote control device to sequence the menu consecutively through its program to facilitate the preprogramming function. As such, a need has developed for a preprogramming device which may be used in conjunction with a television or VCR which allows the user to avoid having to manipulate the program sequence but, rather, allows the user to skip functions which are not desired to be manipulated during the preprogramming function.

The present invention allows such a preprogramming device to be possible since a display may be programmed to display a plurality of menu functions in different regions of the display and through the teachings of the present invention, a cursor may be moved from region to region in any desired order to allow preprogramming to occur.

The present invention includes the following interrelated aspect and features:

a) In a first aspect of the present invention, the inventive device may consist of a camera including a lens and a detector mounted on the head of the user and coupled to a microcomputer via a cord connection. The microcomputer is connected to a driver designed to control the driving of an LED with the microcomputer also being connected to the cursor control circuit of a display device so that movements of the camera with respect to the fixed led will result in electrical signals being created related to the direction at which the user is pointing at the display to thereby cause the cursor of the display to be moved to a corresponding position.

b) In a further aspect, the embodiment described in paragraph a) above may be modified by making the connection between the camera and the computer cordless. This is accomplished by providing a second LED adjacent the camera transmitting at a frequency different from the frequency of transmission of the first mentioned LED and wherein a photodetector is provided adjacent the microcomputer to provide a data linkage allowing communication of signals related to the position of the camera with respect to the fixed LED to be transmitted and received, resulting in movements of the cursor as described above.

c) In a further aspect of the present invention, the inventive system may be used to measure pure rotations. In further explanation, if the camera is located in alignment with the center of the display screen, and the head of the user is rotated about an axis perpendicular to a line going directly to the center of the screen, such rotation will result in the camera being pointed at a different region of the display screen. Such rotations may easily be measured through the teachings of the present invention and will result in movements of the cursor to the appropriate location where the camera is being pointed on the display screen.

d) In a further aspect, the present invention may be used to measure purely linear translations of the camera as mounted on the head of the user, for example. In this regard, if the camera is facing the center of the display screen and aligned with an imaginary line extending from the camera directly to the center of the display screen, if the camera is thereafter linearly moved up, down or to either side or in any other direction linearly, such linear translations may easily be measured through movement of the position of the LED beam on the position sensing detector of the camera. Such translations will result in movements of the cursor on the display screen.

e) The configuration of the present invention wherein only a single position sensing detector and a single light source are required allows an extremely large work area. Whereas typical prior art optically based communications systems require a small work area in the nature of two to three meters square, the present invention may be used within a work area of up to ten meters distance and 180 degrees rotation. Furthermore, the degree of rotation of the camera which is required to cause cursor movements may be adjusted merely by adjusting the focal length between the lens and the detector. The longer the focal length, the lesser the degrees of rotation which are required to cause cursor movements.

f) As has been noted hereinabove, one use for the teachings of the present invention consists of providing a television display with a menu having different regions to which the cursor may be directed through movements of a camera attached to the user thereof. A similar application consists of providing a computer with a menu display having different regions where a cursor may be directed through movements of the camera attached to the head of the user.

g) In a further aspect, the inventive device may provide active dynamic gain control. In this regard, the system may include means for measuring the intensity of light received from the data transmission LED at the photodetector, in the case where wireless connection between the camera and the microcomputer is used. The intensity of light received is proportional to the distance between the remote unit and the fixed unit and this proportionality may be used to control the intensity of light transmitted from the position LED to ensure accurate communications between the position LED and the camera and position sensing detector.

h) In a further aspect, in embodiments wherein wireless communication linkage is utilized, the position LED may be used to communicate data to the camera section of the device. In this regard, data communication pulses may be sent by simple manipulation of the software of the microcomputer, which pulses may be received as pulses on the position sensing detector in the camera section. A two-way communication link enhances the accuracy of the system of the present invention.

i) If desired, optical filters may be employed in front of the camera section of the invention to filter out unwanted light. Furthermore, cursor control driver software may be provided which would allow positioning of the cursor in a particular position on the screen for a predetermined period of time to result in operation of some aspect of the display device rather than a requirement for pushing a button when the cursor is at the desired position.

As such, it is a first object of the present invention to provide an improved optical pointing device.

It is a further object of the present invention to provide such an optical pointing device with either cord connection between the detector and computer or cordless connection therebetween.

It is a further object of the present invention to provide such an improved optical pointing device wherein only a single light source and a single detector is required.

It is a yet further object of the present invention to provide such a device which may detect not only camera rotations but camera translations.

It is a yet further object of the present invention to provide such a device which may be used in a far larger space than is possible with prior art devices.

It is a still further object of the present invention to provide such a device having active dynamic gain control, a two-way communication link as well as cursor control driver software.

These and other objects, aspects and features of the present invention will be better understood from the following detailed description of the preferred embodiments when read in conjunction with the appended drawing figures.

BRIEF DESCRIPTION OF THE DRAWINGS

FIG. 15 shows a schematic diagram of an application of the present invention corresponding to the schematic diagram of FIG. 1.

FIG. 16 shows a schematic diagram of an application of the present invention corresponding to the schematic diagram of FIG. 2.

SPECIFIC DESCRIPTION OF THE PREFERRED EMBODIMENTS

Figure 1:
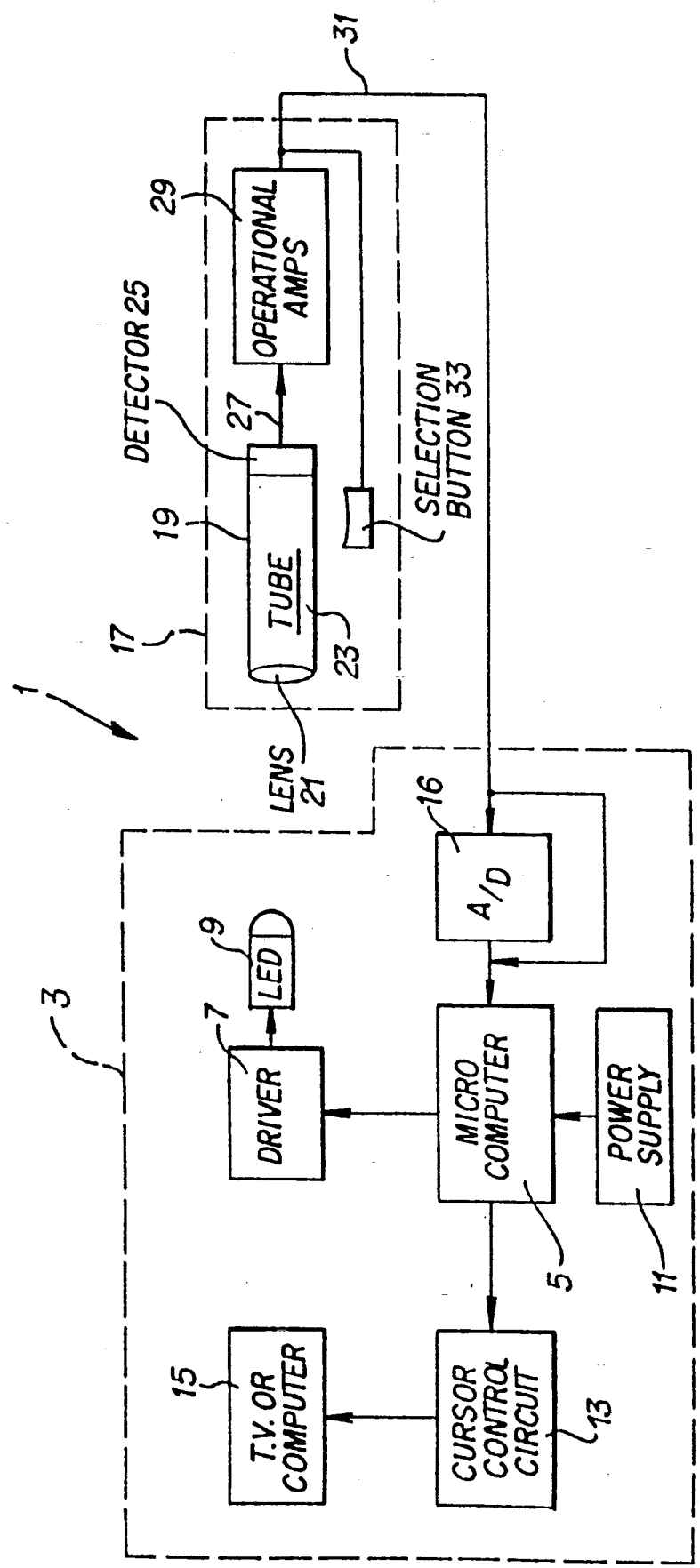
FIG. 1 shows a schematic view of a first embodiment of the present invention.

With reference to FIG. 1, a first example of an improved optical pointing device is generally designated by the reference numeral 1 and is seen to include a fixed unit 3 having a microcomputer 5 which controls a driver 7 in illuminating a light emitting diode 9. A power supply 11 provides power to the microcomputer which is also interconnected into the cursor control circuit 13 of an associated display device such as, for example, a television or computer cathode ray tube generally designated by the reference numeral 15.

The device 1 further includes a moveable unit generally designated by the reference numeral 17 which includes a camera 19 having a lens 21, an elongated tube 23 and a detector 25 at an end of a tube 23 opposite to the end at which the lens 21 is located. As will be described in greater detail hereinafter, the detector 25 may, if desired, be of the type illustrated in FIGS. 4, 5 and 6 of U.S. Pat. No. 4,576,481. The detector 25 has outputs generally designated by the reference numeral 27 in FIG. 1 which connect the detector 25 with operational amplifiers 29 which amplify the signals and translate them into proportional voltages and then convey them to the microcomputer 5 in the fixed unit 3 via a cord 31 and an analog-to-digital converter 16. A selection button 33 may be provided in the moveable unit 17 to control activation and deactivation thereof.

FIG. 15 shows an example of an application of the embodiment of FIG. 1. Of note is the location of the LED 9 and driver 7 in a single housing 8 placed on top of the display device 15. The moveable unit 17 may be mounted on a moveable object such as, for example, the hand of the user with the lens 21 of the camera 19 thereof facing in the general direction of the LED 9.

With the device activated, the microcomputer 5 controls the driver 7 to cause the LED 9 to pulse in a predetermined pattern. Depending upon the particular orientation of the moveable unit 17 with respect to the light emitting diode 9, a light beam is focused by the lens 21 onto the position sensing detector 25 at a particular location thereon, which particular location causes currents to be developed on the position sensing detector 25, which currents are translated into proportional voltages and transmitted via operational amplifiers 29 to the microcomputer 5 via the cord connection 31 and the analog to digital converter 16. Based upon these sensed and interpreted signals, the microcomputer 5 causes activation of the cursor control circuit 13 of the device 15 to cause the cursor 14 to move to a position in alignment with the direction of orientation of the tube 23.

Figure 4:
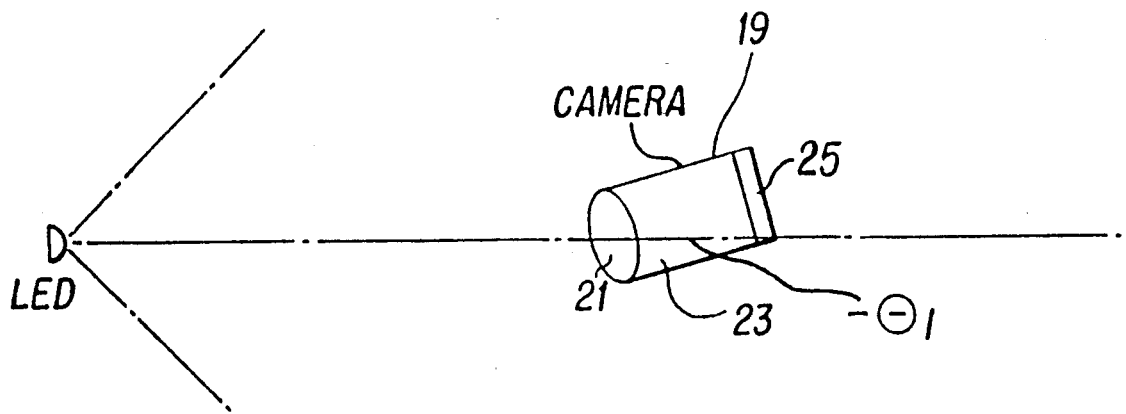
Figure 5:
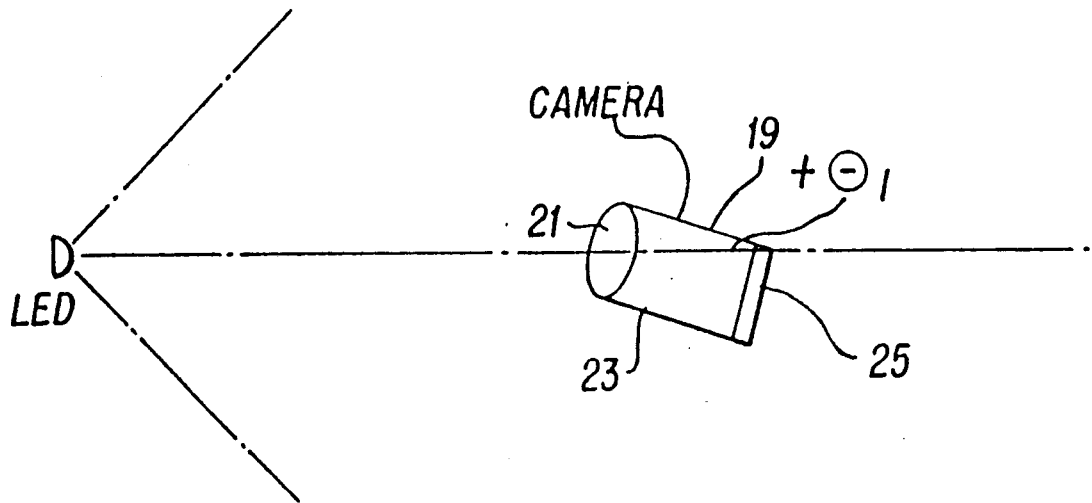
Figure 6:
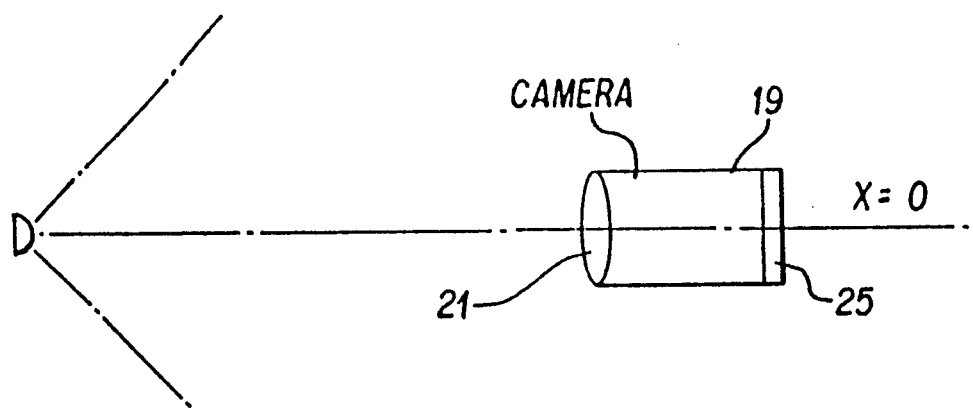
FIGS. 6, 7 and 8 are schematic diagrams demonstrating the ability of the present invention to detect camera translations.
Figure 19:
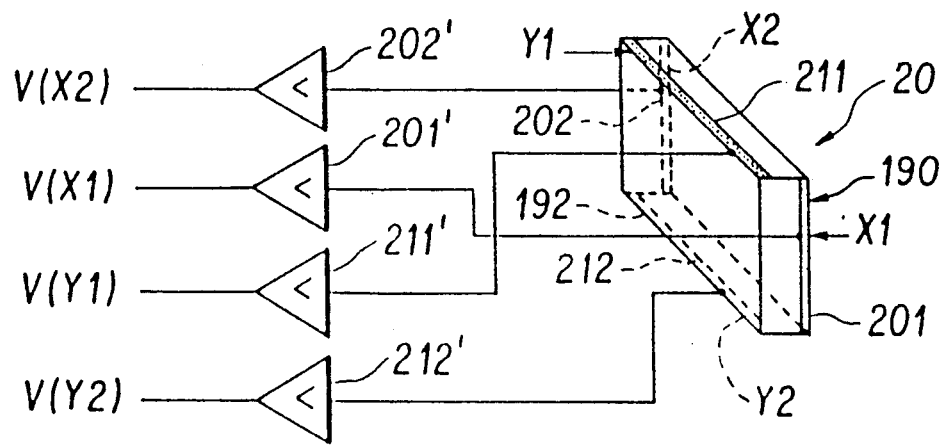
FIG. 19, 20 and 21 correspond, respectively to FIGS. 4, 5 and 6 of U.S. Pat. No. 4,576,481.
Figure 20:
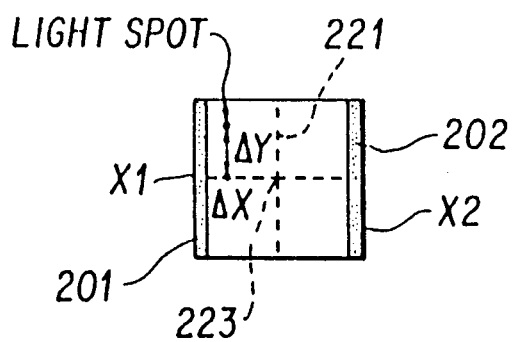
Figure 21:
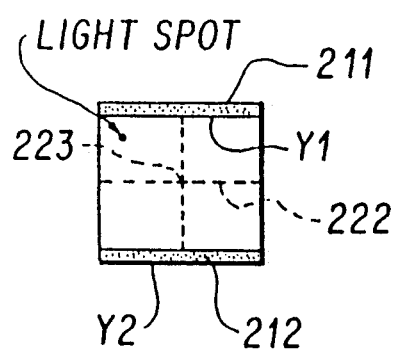

In order to better understand the operation of the position sensing detector 25, and all other position sensing detectors disclosed in this patent application, reference is now made to FIGS. 19, 20 and 21 which correspond to FIGS. 4, 5 and 6 in U.S. Pat. No. 4,576,481. The explanation of the operation of the position sensing detector (PSD) 20 disclosed therein is hereby reproduced as follows:

The PSD 20 uses a highly sensitive planar type PIN silicon photodiode with uniform layers formed on the top and bottom thereof. When a light spot is focused upon the active area of the PSD, electron-hole pairs are generated at the focused spot in the depletion layer thereof. Output currents are thereby formed on both resistive layers 190, 192 at each of the four electrodes, X-axis electrodes 201, 202 and Y-axis electrodes 211, 212. Currents to electrodes 201, 202 are collected through top resistive layer 190 whereas currents to electrodes 211, 212 are collected through resistive layer 192. These currents are divided in proportion to the resistance between the focused spot and the particular electrode, such resistance being proportional to the distance from the electrode to the spot. The sum of the currents from X-axis electrodes 201, 202 is proportional to light spot intensity as is the sum of the currents from Y-axis electrodes 211, 212.

The difference between the currents from the two X-axis electrodes I202-I201 is proportional to the intensity of the light spot as well as the distance of the light spot to the null line 221 (FIG. 20) midway between the X-axis electrodes 201, 202. If the light spot was directly in the middle, on the line 221, the two currents I202 and I201 would be equal. I202>I201 when the light spot is closer to electrode 202 and I201>I202 when the light spot is closer to electrode 201. Similarly, the difference between the currents from the two Y-axis electrodes 211, 212 is proportional to the light spot intensity and the distance of the light spot to the null line 222. (FIG. 21)

The output current from each of the electrodes is led to a respective transimpedance preamplifier 201', 202', 211', 212' which provides gain and converts the current to a proportional voltage:

$V_{201'}$ corresponding to X electrode 201;
$V_{202'}$ corresponding to X electrode 202;
$V_{211'}$ corresponding to Y electrode 211;
$V_{212'}$ corresponding to Y electrode 212.

Dividing the differences between the voltages with the sum of the voltages for the X and Y electrodes will result in a figure which is proportional only to the distance of the light spot from the respective null line 221 or 222. Thus:

$$\frac{V_{201'} - V_{202'}}{V_{201'} + V_{202'}} \text{ is proportional to } \Delta X$$

$$\frac{V_{211'} - V_{211'}}{V_{211'} + V_{211'}} \text{ is proportional to } \Delta Y.$$

In each equation, the result will be positive or negative depending upon on which side of the null lines 221, 222 the light spot is located. While the location of the null lines may be adjusted electronically, in the preferred embodiments, such adjustments are not made. Bias voltages are used by the preamplifiers 201', 202', 211', 212' but only to calibrate the null point 222 to be exactly in the middle of the photodiode.

The intensity of the light spot is proportional to the distance between the respective PSD and the respective retro-reflector, however, inaccuracies are inherent when measuring such intensity by summing preamplifier voltages. As such, in the preferred embodiments, this summing technique is not used.

As such, the operation of the position sensing detector 25 shown in FIGS. 1 and 15 as well as all other position sensing detectors disclosed in this patent application should be understood.

Figure 2:
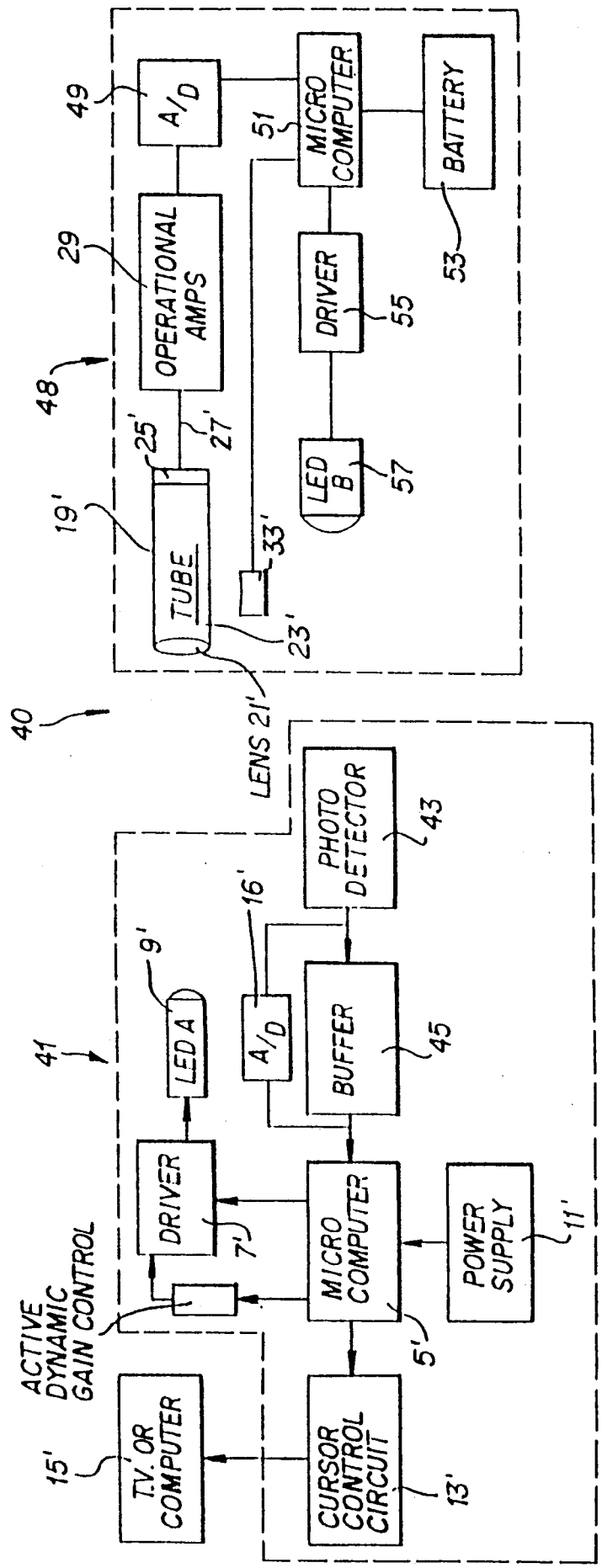
FIG. 2 shows a schematic view of a second embodiment of the present invention.

Now, reference is made to FIG. 2 wherein a further embodiment of optical pointing device is depicted. Since FIG. 2 includes several aspects in common with the embodiment of FIG. 1, like elements will be referred to by like primed reference numerals.

The device 40 seen in FIG. 2 includes a fixed unit 41 and a moveable unit 48. The fixed unit 41 is designed to mounted on a display device 15' such as a television or computer cathode ray tube device.

The fixed unit 41 includes a housing 47 (FIG. 16) in which are contained a driver 7', and a first LED 9'. A microcomputer 5' controls operation of the driver 7' as well as operation of the cursor control circuit 13' of the display device 15'. A power supply 11' provides power to the microcomputer 5'. The fixed unit 41 further includes a photodetector 43 connected to the microcomputer 5' via an analog-to-digital converter 16' and a buffer 45.

With further reference to FIG. 2, it is seen that the moveable unit 48 includes a camera 19' having a lens 21', an elongated tube 23' and a position sensing detector 25' connected to operational amplifiers 29' via a cord connection 27. The operational amplifiers 29' amplify the currents received via the cord connection 27' and translate them into proportional voltages as should be understood from the above discussion of FIGS. 19, 20 and 21 and the operational amplifiers furnish these amplified signals to the microcomputer 51 via an analog-to-digital converter 49. The microcomputer 51 is powered by a battery 53 to allow the unit 48 to be portable in nature. The microcomputer 51 controls operation of the driver 55 to controllably drive a second light emitting diode 57.

An example of an application of the embodiment of FIG. 2 is illustrated in FIG. 16, wherein the housing 47 containing the LED 9' and driver 7' is mounted on top of the display device 15' with the photodetector 43 being mounted spaced therefrom. In the operation of the device 40, the microcomputer 5' controls the driver 7' to cause the first LED 9' to illuminate in a predetermined manner. Movements of the moveable unit 48 cause the beam of light from the first LED 9' to be focused on the surface of the position sensing detector 25' in a manner corresponding to the relationship between the orientation of the tube 23' and the fixed position of the first LED 9'.

Signals from the position sensing detector 25' are conveyed via the connection 27', the operational amplifiers 29' and the analog to digital converter 49 to the microcomputer 51 which controls the driver 55 to cause to second LED 57 to pulse in a predetermined manner to convey signals indicative of the proportional voltages outputted by the position sensing detector 25' to the photodetector 43 in the fixed unit 41. Such signals are conveyed via the buffer 45 and the analog to digital converter 16' to the microcomputer 5' which receives such signals and, responsive thereto, causes appropriate operation of the cursor control circuit 13' to move the cursor 14' to a position in alignment with the position of the tube 23'.

In further explanation of the embodiment illustrated in FIGS. 2 and 16, it should be understood that two-way communication exists between the fixed unit 41 and the moveable unit 48. In particular, the microcomputer 51 in the moveable unit 48 controls a first communication link, namely from the moveable unit 48 to the fixed unit 41. The software program in the microcomputer 51 controls the transmission of pulsed infrared light from the second LED 57. These infrared light pulses are received at the photodetector 43 in the fixed unit and are converted into electrical pulses which are then led into a digital input port in the microcomputer 5' via a buffer 45.

The computer program of the microcomputer 5' will read the received pulses as digitized and will take appropriate actions in response thereto concerning operation of the driver 7' and the transmission of signals to the cursor control circuit 13'. The microcomputer 5' controls what might be termed a second communication link, namely from the fixed unit 41 to the moveable unit 48. The software program of the microcomputer 5' controls the transmission of the information as pulsed infrared light emitted from the first LED 9'. These infrared light pulses are received at the position sensing detector 25' in the moveable unit 48 and the resulting currents as described hereinabove with reference to FIGS. 19, 20 and 21 from the four connectors in the position sensing detector 25' are translated into voltages in the operational amplifiers 29'. One of these voltages is led into the digital input port of the microcomputer 51 and the program of the microcomputer 51 will process the incoming data, derive information therefrom and take appropriate actions.

In further discussion of the embodiment illustrated in FIGS. 2 and 16, the manner of programming of the system 40 will now be described. In particular, when the selector button 33' is held down, the software program in the movable unit 48 causes the currents received from the position sensing detector 25,' due to ambient light, to be translated into voltages in the operational amplifiers 29' and to thereafter to be read into the microcomputer as digital numbers via the analog to digital converter 49. These number are then sent from the second LED 57 as infrared light pulses which are received at the photodetector 43 and are thereafter translated into electrical signals and imputted into the microcomputer 5' via a digital input port. These signals are stored in the microcomputer 5' so that they may later be used to compensate for ambient light in later calculations.

Thereafter, the software program in the microcomputer 5' causes the driver 7' to drive the first LED 9' to transmit a short pulse of infrared light which is received at the position sensing detector 25'. The four resulting currents from the four electrical connectors on the position sensing detector 25' (FIGS. 19-21) are than translated into voltages and are read into the microcomputer 51 via the analog-to-digital converter 49 as digital numbers. The software program in the moveable unit 48 will then transmit the digital numbers as infrared light pulses from the second LED 57 to the photodetector 43 whereupon they are inputted into the microcomputer 5'. The microcomputer 5' subtracts from each digital number a number corresponding to the compensation for ambient light based upon the ambient light measurements previously made.

Thereafter, based upon the position of light focused on the position sensing detector 25' active surface via the lens 21', line of sight determination is made and the microcomputer 5' is activated to control the cursor control circuit 13' to cause the cursor 14' to be moved to a position aligned with the direction of alignment of the elongated tube 23'.

When the selector button 33' is released, the system stops operation. Furthermore, the software programs are interpret driven and, as should be understood, the system works with a microcomputer 5' serving as the master and the microcomputer in the moveable unit 48 serving as the slave.

Referring back to FIGS. 1 and 15, the system 1 described with reference thereto is programmed in a similar manner to the programming of the system 40 illustrated in FIGS. 2 and 16. In this regard, when the selector button 33 is depressed, the software program in the microcomputer 5 will compensate for ambient light in the same manner as is the case with the device 40, measuring the four received currents from the position sensing detector 25 which relate to the intensity of ambient light, converting the signals into digital signals and imputting them into the memory of the microcomputer 5 for later use to subtract from measurements received when the LED 9 is operating. Line of sight determination is made in the same manner as it is made with reference to the device 40.

In each of the devices 1 and 40, the microcomputer in the fixed unit, 5 or 5' as the case may be, has a software program which controls operation of the cursor control circuit 13, 13' respectively. This software program keeps track of the position of the cursor 14, 14' on the display of the device 15, 15' at all times and compares the position of the incoming light dot on the active area of the position sensing detector 24, 25' and responsive to differences between these respective conditions, moves the cursor 14, 14' to the same position on the monitor.

If the light dot on the active area of the position sensing detector 25, 25' is centrally located thereon, then the cursor will be placed in the middle of the display screen. Correspondingly, if the light dot on the active area of the position sensing detector 24, 25' is on the left hand side thereof, the software will control the cursor control 13, 13' to move the cursor 14, 14' to the left-hand side of the monitor screen. Thus, a one to one relationship is maintained between the position of the incoming light dot on the active area of the position sensing detector 25, 25' and the position of the cursor 14, 14' on the display screen. Even if the configuration of the active area of the position sensing detector 25, 25' is slightly different from the specific shape of the display screen, these differences may be programmed into the software so that the proportionality will be maintained. The software program knows the existing position of the cursor 14, 14' on the display screen and is able to calculate the new position of the cursor thereon and to provide the cursor control circuit with the appropriate signals to facilitate moving of the cursor 14, 14' to a new position corresponding to the position of the light dot on the active area of the position sensing detector 25, 25'.

In the embodiments of FIGS. 1 and 2, the intensity of the light dot on the active area of the position sensing detector may be measured as explained hereinabove with reference to FIGS. 19-21. This intensity measurement, where used, may be used to place the cursor 14, 14' in a particular location of the display screen, for example, in the upper lefthand corner thereof, if the intensity of the incoming light dot is less than a predetermined level. This may be incorporated into the system to provide a feedback aspect for the user of the system to let the user know when the moveable unit 17, 48 is too far away from the respective fixed unit 3, 41 to allow the respective devices to operate effectively. If the intensity measurement results in a reading higher than the predetermined level, normal position determination and cursor movement will take place only to be interrupted by either movement of the selector button 33, 33' to the off position or movement of the moveable unit 17 or 48 to a position too remote from the respective fixed unit 3, 41 to render accurate measurements possible.

Figure 3:
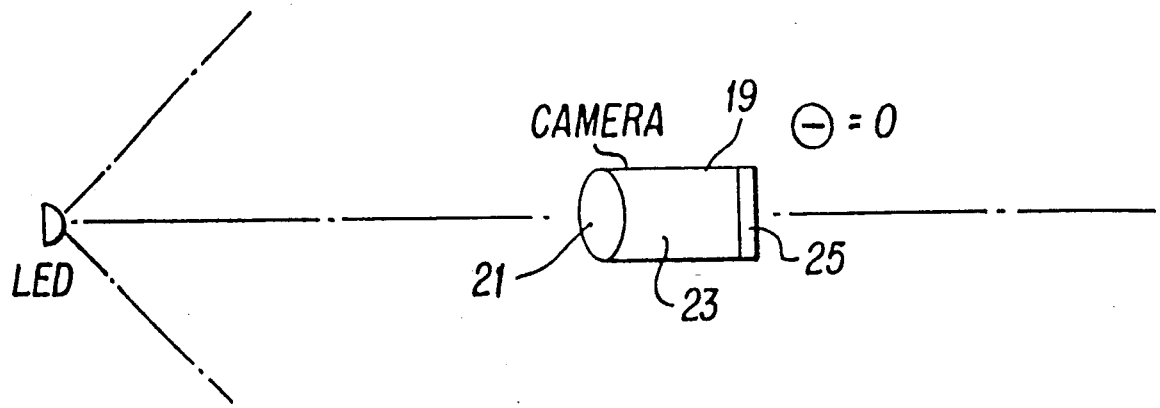
FIGS. 3, 4 and 5 are schematic diagrams demonstrating the ability of the present invention to detect camera rotations.

With reference, now, to FIGS. 3, 4 and 5, the manner of operation of the inventive devices to measure pure rotations will be explained.

Each of the Figures shows the camera 19 having an elongated tube 23 with the lens 21 at one end thereof and the position sensing detector 25 at the other end thereof. Of course, the camera 19' is identical in structure to the camera 19 and, as such, the analysis of FIGS. 3, 4 and 5 as well as that of FIGS. 6-14 is the same for either camera.

FIG. 3 shows the camera 19 aligned with the middle of the display screen (not shown) at an angle $\theta$ equals 0 with respect to a line perpendicular to the display screen. At such position, with the LED as shown, the cursor 14 will be at the center of the screen.

FIG. 4 shows the camera 19 rotated with respect to its position shown in FIG. 3 to an angle of minus $\theta_1$ with respect to the above described axis. In such orientation of the camera 19, the cursor will be located at the bottom of the display screen.

FIG. 5 shows the camera 19 rotated in the opposite direction to an angle of $+\theta_1$ with respect to the above described axis. In such position, the cursor will be located at the top of the display screen. In a similar manner, left-hand and right-hand rotations into and out of the paper in the view of the Figures will result in similar corresponding translations of the cursor on the display screen. Thus, it is seen that the present invention allows the user to move the head in rotary motions without translation to cause the cursor to move on the display screen.

Figure 7:
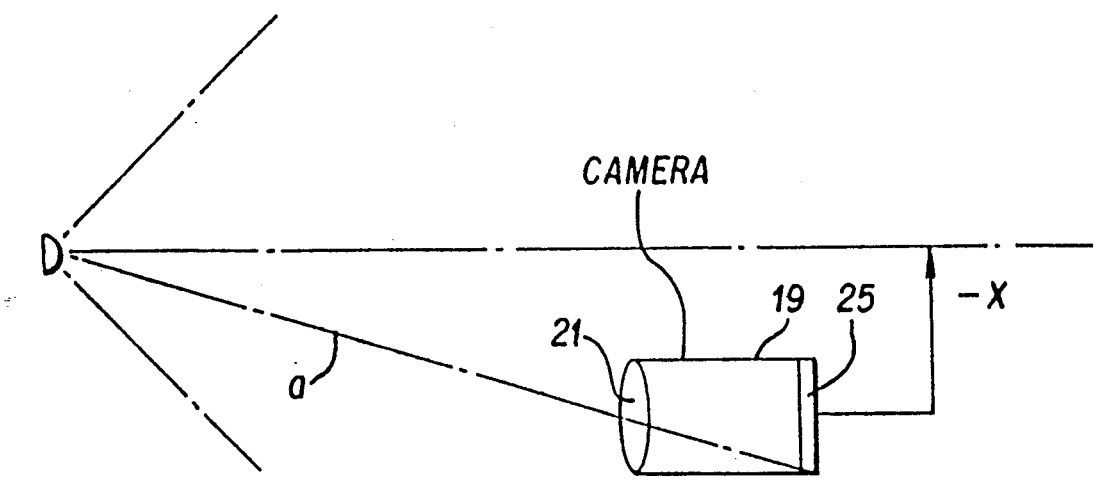
Figure 8:
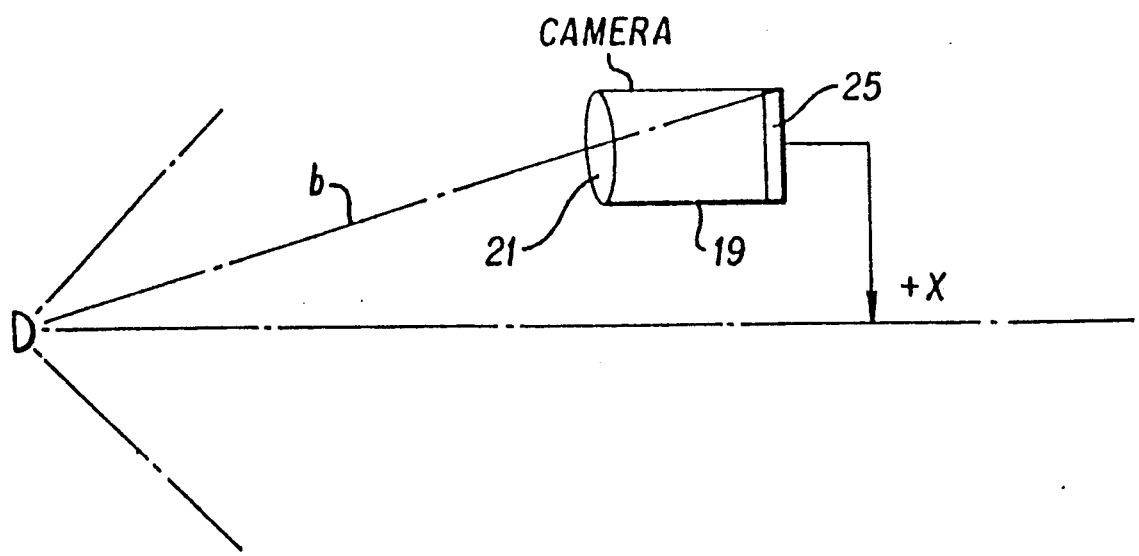

FIGS. 6, 7 and 8 show how the inventive devices may measure pure translation without rotation. Thus, FIG. 6 corresponds to FIG. 3 in that the camera is aligned with the axis extending perpendicularly from the surface of the display screen. In such position, the cursor will be at the center of the screen.

FIG. 7 shows the camera translated to a position minus X with respect to the aforementioned axis with the camera axis being parallel thereto. In such position, as illustrated in the Figure, the line a directly from the LED to the position sensing detector of the camera as focused by the lens 21 causes the beam to be focused on the active region of the position sensing detector 25 on a lower portion thereof thus causing the cursor to be moved to a lower position on the display screen.

FIG. 8 shows the camera translated upwardly a distance plus X from the aforementioned axis while the longitudinal axis of the camera is parallel thereto. In such position, the beam from the LED designated by the reference letter b in FIG. 8 is focused by the lens 21 on an upper region of the active area of the position sensing detector 25 thus causing the cursor to be moved to an upper region of the display screen. Of course, the same results would accrue through translations of the camera in the Y direction into and out of the paper in the view of FIGS. 6–8 without rotations. Such movements would result in movements of the cursor left and right on the display screen.

It should also be understood from the discussion of FIGS. 3–8 that combinations of rotations and translations will result in corresponding predictable movements of the cursor on the display screen with the result being that the cursor will be moved to the position where the camera is pointing regardless of whether translations or rotations or both have occurred.

Figure 9:
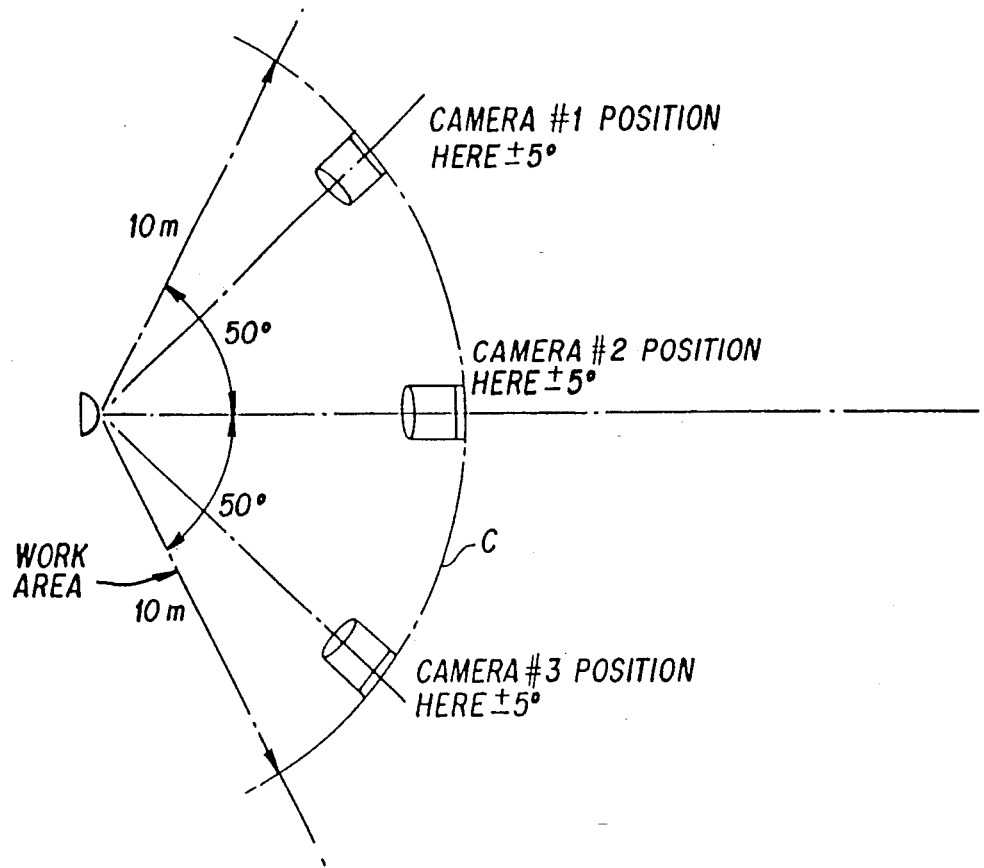
FIG. 9 shows the ability of the invention to operate in a large space.

Experiments have shown that due to the ability of the system to measure translations, rotations and combinations thereof, an extremely large work area may be used. FIG. 9 shows a work area having a radius of ten meters and an angle of 50 degrees about all sides of the aforementioned axis perpendicular to the surface of the display. Thus, the work area illustrated in FIG. 9 is somewhat conical but with a part spherical base designated by the reference letter c in FIG. 9.

With further reference to FIG. 9, the indicia plus and minus five degrees is shown adjacent each shown camera position. This is to signify that movements of a camera in rotation or translation of greater than five degrees will cause the cursor to move based upon the focal length of the camera as shown in FIG. 9.

Figure 10:
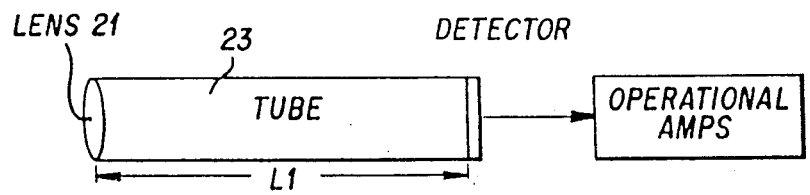
FIGS. 10, 11 and 12 are schematic diagrams showing the effect which adjustments in focal length of the detector have on the amount of rotation of the detector necessary for sensing by the system.
Figure 11:
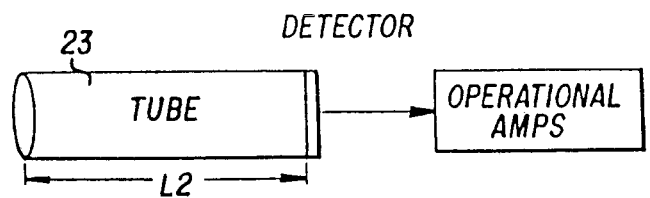
Figure 12:
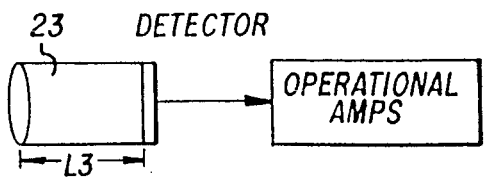

With further reference to FIGS. 10, 11 and 12, it is seen that by varying the focal length of a camera by varying the length of the tube 23 thereof, one may vary the amount of angular movement of the camera which is required to cause cursor movement. Thus, for comparison of FIGS. 11, 12 and 13, it is seen that the longer the focal length, the lesser the angle which is necessary to cause cursor movement. Thus, the long focal length of the FIG. 10 camera has resulted in the requirement that angular movements of greater than five degrees are necessary to cause cursor movement. The shorter focal length of the tube 23 in FIG. 11 is termed a medium focal length and results in a requirement of angular movement of plus and minus 15 degrees to cause cursor movement. Finally, the shortest focal length of the tube 23 shown in FIG. 12 results in the largest amount of angular movement of the camera required to cause cursor movement, namely, plus and minus 30 degrees. Thus, by adjustment of the focal length of the tube 23 of the camera 19, the degree to which the camera must be rotated or translated to cause cursor movement may be adjusted to optimize the device depending upon the size of the space which is to be employed.

Figure 13:
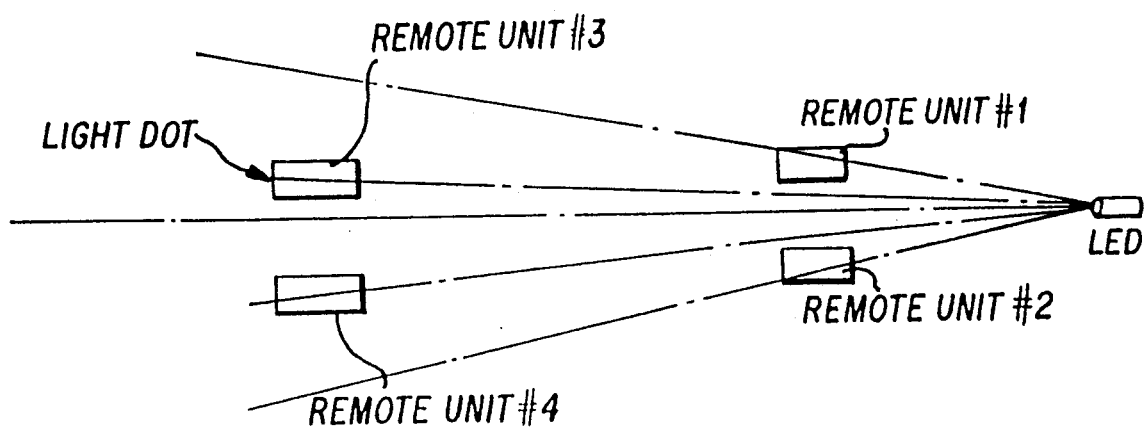
FIGS. 13 and 14 depict schematic diagrams showing the ability of the system to measure both rotations and translations of the detector.
Figure 14:
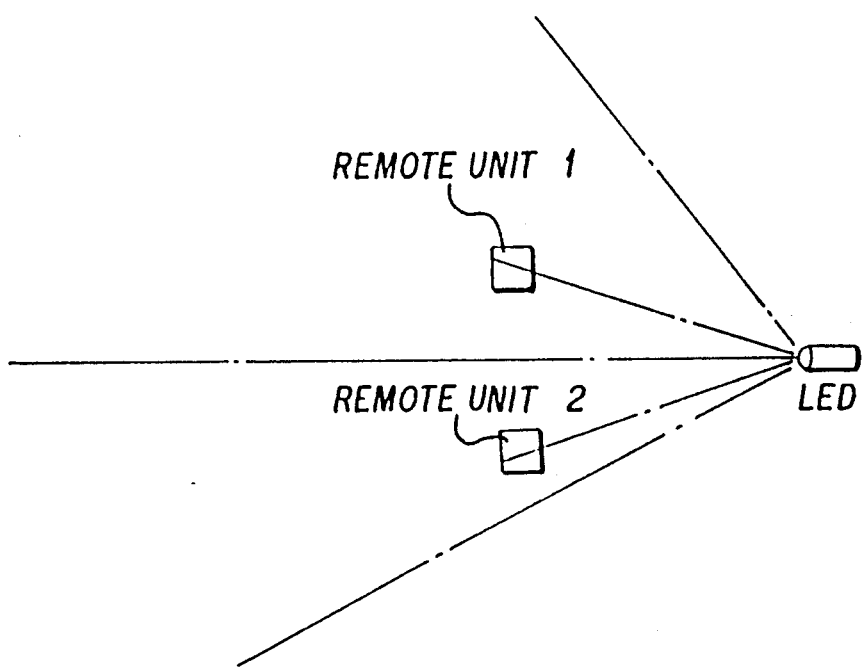

As described hereinabove with reference to FIGS. 3–8, the inventive systems are sensitive to both rotations and translations of the camera or combinations thereof. This is further emphasized with reference to FIGS. 13 and 14. As illustrated in FIG. 13, each system is more sensitive to translation when the moveable unit is closer to the fixed unit than when they are more separated from one another. As explained hereinabove with respect to FIGS. 10, 11 and 12, the shorter the focal length is, (the larger the rotation angle and/or translation distances) the less influence translation has and the system becomes more of a rotation sensitive device. This is also illustrated in FIG. 14.

Figure 18:
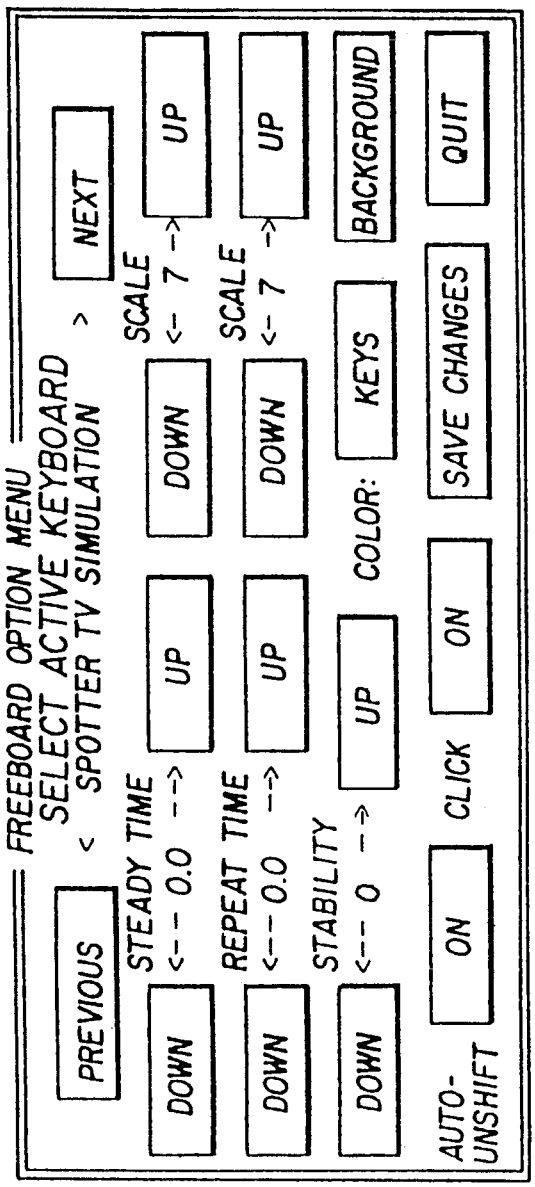
FIG. 18 shows a schematic diagram of a software menu which may be used to control the cursor in the various embodiments of the present invention.

With reference to FIG. 18, a keyboard menu on the screen 60 may be provided to allow choosing of various operating options which may then be undertaken through adjusting of the preprogrammed software. Thus, such a keyboard may be utilized to adjust the required rotation angle and/or translation distance in the left and right direction as well as up and down or combinations thereof. It is also possible through a device such as the keyboard menu 60 to adjust the amount of time the cursor must be maintained in a predetermined position for a predetermined time to cause computer functions to result such as, for example, switching of modes based upon maintenance of the cursor over a mode changing region of the display.

Figure 17:
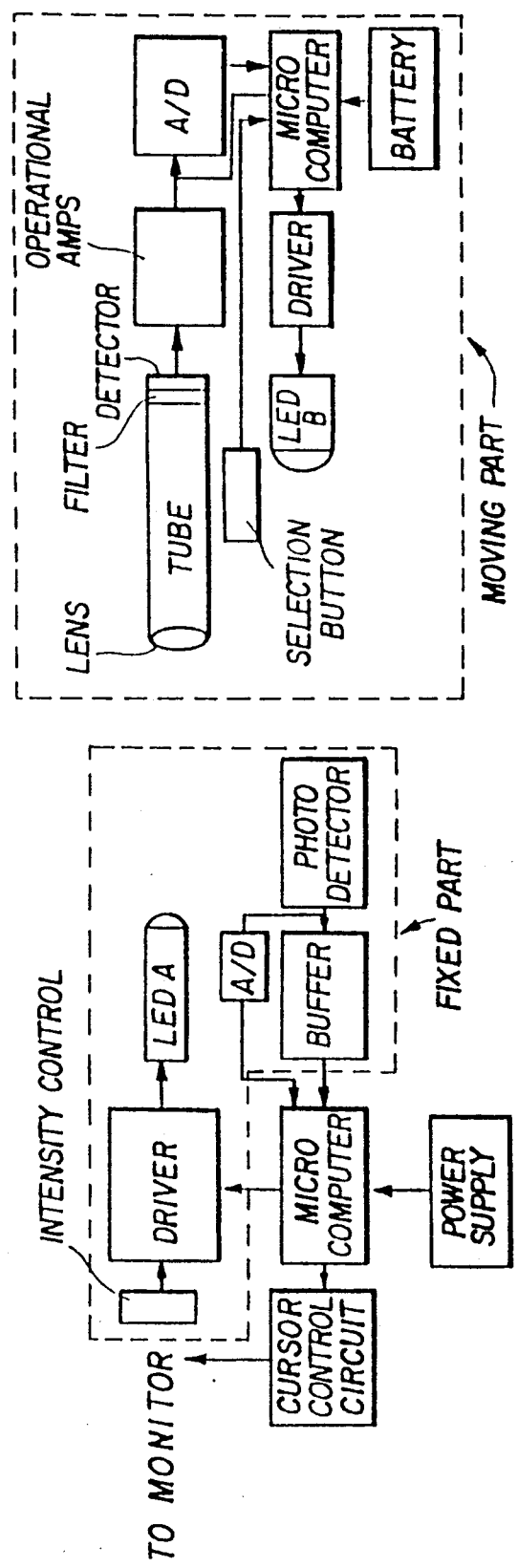
FIG. 17 shows a schematic diagram of the invention shown in FIGS. 2 and 16 including the concept of active dynamic gain control.
Figure 22:
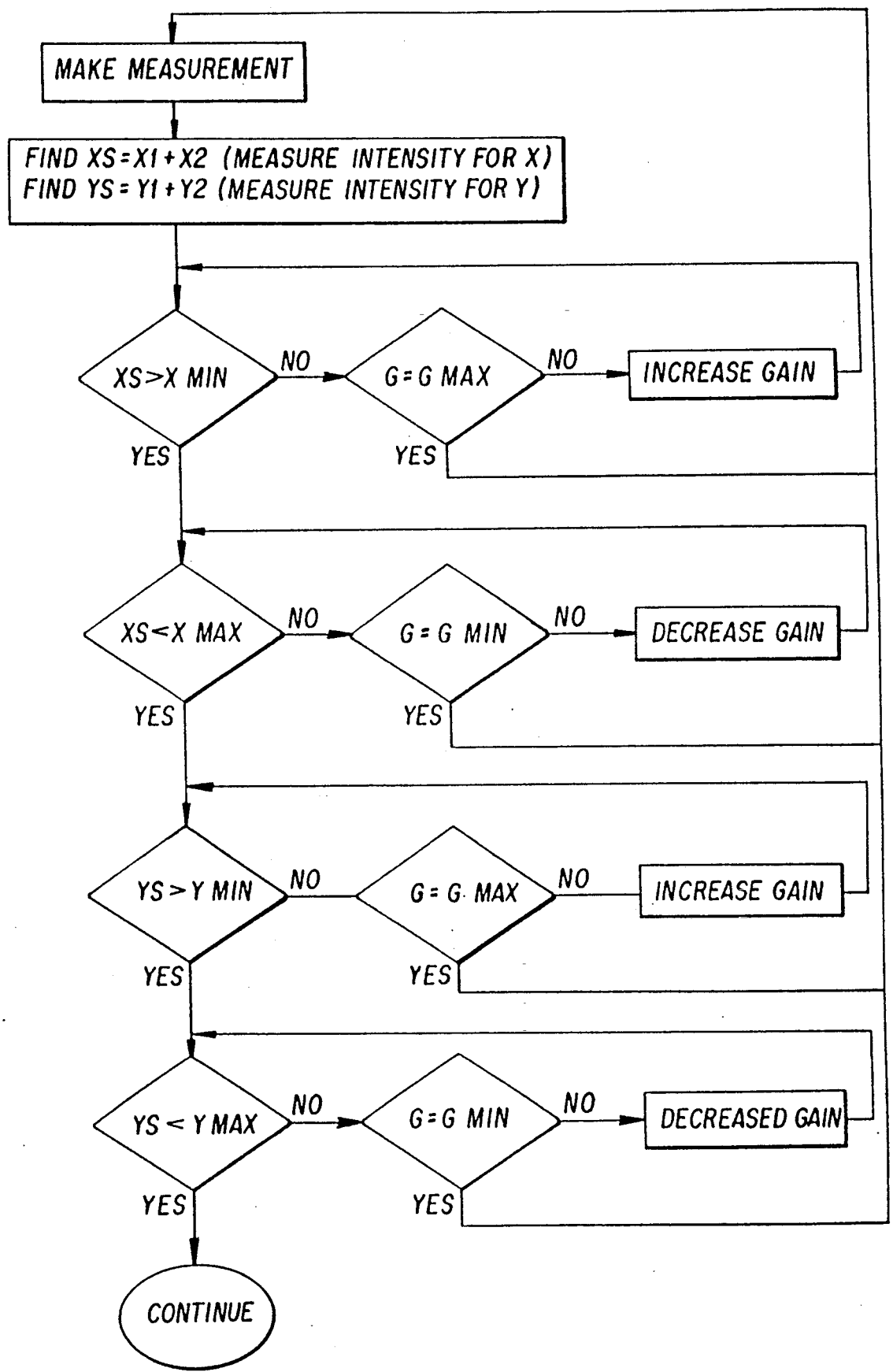
FIGS. 22 and 23 correspond, respectively, to FIGS. 17 and 18 of co-pending application Ser. No. 06/704,526, filed Feb. 22, 1986.

Such a feature allows the use of a time/position switching of selected items instead of the requirement for actually pressing a button while the cursor is in a desired location. In such a case, the user would only have to point at the selected block or region on the display screen for the preselected predetermined time in order for a button click to be simulated in the software. A decision button could of course also be provided As briefly discussed hereinabove, the present invention may be provided with dynamic gain control similar in nature to that which is disclosed in co-pending U.S. patent application Ser. No. 06/704,526, filed Feb. 22, 1986. In this regard, FIGS. 22 and 23 herein correspond, respectively, to FIGS. 17 and 18 in the aforementioned co-pending U.S. patent application. The description of operation from the co-pending application is reproduced hereinbelow with the Figure numbers being transposed to their identifying numbers as set forth herein as follows:

The flow chart shown in FIG. 22 shows the manner in which the gain of the present invention is increased or decreased responsive to the sensing of the location of the cursor at an extreme edge of the screen. For example, if Xs is greater than XMAX, then the gain is decreased, if the gain is decreased until it reaches GMinimum then there is too much received light and this indicates that there is something wrong with the system. Perhaps somebody is playing with the lens, putting something too close to the lens, or perhaps extreme sunlight or artificial light are facing directly into the lens. In any of these circumstances, an error flag is activated and the cursor may move in a circular fashion in the middle of the screen until the problem is corrected. A similar result is obtained when YS becomes greater than YMAX. Further, a similar result is obtained when YMin becomes less than YO and XMin becomes less than XO.

Figure 23:
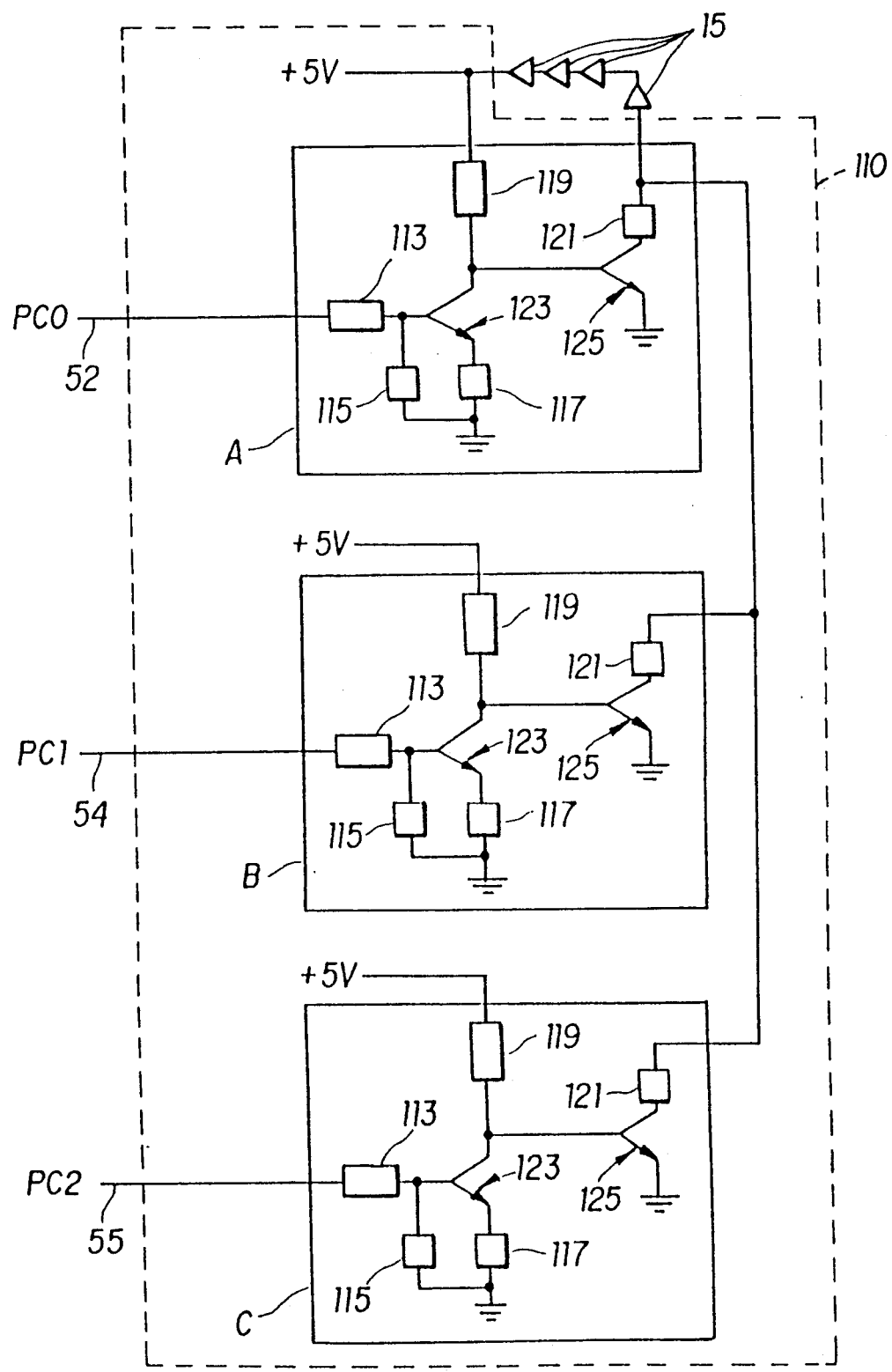

The specific circuitry utilized in the gain feedback scheme is seen in FIG. 23. The entire circuit is generally designated by the reference numeral 110 and further reference is made to FIG. 2 of the co-pending application which shows the manner of connection of the circuit 110 into the microprocessor thereof in analogous manner to the manner of interconnection herein. Comparison of FIGS. 2 of the co-pending application and 23 herein should make clear that the manner of connection of the circuit 110 to the microprocessor 53 of the co-pending application is via the ports PC0, PC1 and PC2 of the microprocessor 53, and respective electrical wires 52, 54 and 55. The gain feedback circuit 110 as shown in FIG. 23 is designed to control the light output of the light sources 15 shown in FIG. 23 as light emitting diodes. Such control is accomplished through control of the current flowing through the light sources 15.

As shown in FIG. 23, the circuit 110 includes three subcircuits connected to one another in parallel and designated in FIG. 23 with the reference numerals A, B and C respectively. Each of these subcircuits includes respective resistors 113, 115, 117, 119 and 121. Each of the subcircuits further includes transistors 123 and 125. In one example of a circuit which may be made in accordance with the present invention, each of the resistors 113 may have a value of 4.7 K ohms, each of resistors 115 may have a resistance of 10 K ohms, each of the resistors 117 may have a resistance of 470 ohms and each of the resistors 119 may have a resistance of 100 ohms. In the same example, the resistor 121 of subcircuit A may have a resistance of 10 ohms, the resistor 121 of subcircuit B may have a resistance of 5 ohms and the resistor 121 of subcircuit C may have a resistance of 1 ohms. As should be evident to one skilled in the art, with at least one of the subcircuits A, B, or C activated by the control port respectively PC0, PC1 or PC2, there are seven possible combinations of levels of current which may flow through the circuit 110 to thereby provide seven possible levels of light sources 15. Table 1 shows the circuit resistance which is inversely proportional to the circuit current for activations of the various combinations of the ports PC0, PC1 and PC2, with 0 indicating an off condition and 1 indicating an on condition.

| Resistance Ω | PC2 | PC1 | PC0 |
| --- | --- | --- | --- |
| 10 | 0 | 0 | 1 |
| 5 | 0 | 1 | 0 |
| 3.33 | 0 | 1 | 1 |
| 1 | 1 | 0 | 0 |
| 0.909 | 1 | 0 | 1 |
| 0.833 | 1 | 1 | 0 |

| -continued | | | |
| --- | --- | --- | --- |
| Resistance Ω | PC2 | PC1 | PC0 |
| 0.769 | 1 | 1 | 1 |

In the operation of the gain feedback circuitry shown in FIG. 23, the microprocessor 53 activates the circuits 110 and 111 in a sequential fashion so that light is emitted and impinges upon the horizontal and vertical aspects of the position sensing detector 13. The microprocessor receives the appropriate signals from the analog-to-digital converter 49 and one of the things which the microprocessor senses is the intensity of the light impinging upon the layers 27 and 29 of the position sensing detector 13. As explained by the flow chart shown in FIG. 22, the circuit shown in FIG. 23 is usable to determine whether the user's line-of-sight is aiming away from the display screen or whether there is some malfunction in the system.

In further clarification of the active dynamic gain control aspect, the system measures the intensity of light received from the data transmission LED of the moveable unit as received by the photodetector of the fixed unit. Such light intensity is proportional to the distance between the fixed unit and the moveable unit and crude range measurement which may be employed as a result thereof may be used to control the intensity of light which is transmitted from the first LED which is located in the fixed unit. Active dynamic gain control takes advantage of the two-way communication which is inherent in the system illustrated in FIGS. 2 and 16. In fact, in the system of FIGS. 2 and 16, active dynamic gain control is more effective than it is as employed in the co-pending patent application in light of the two-way communication disclosed herein. As should be understood by those skilled in the art, dynamic gain control gives a better signal to noise ratio and thereby provides better resolution and accuracy. Through the use of dynamic gain control, the received light dot intensity may be kept practically constant at all times.

With the above paraphrased section from the co-pending patent application having been set forth, it should be understood that the despite the fact that the present invention does not employ a retro-reflector, dynamic gain control may just as feasibly be used in the present invention. In applying this dynamic gain control concept to the teachings of the present invention, for example, in the embodiment of FIG. 1, the microcomputer 5 may be programmed with the dynamic gain control technique described above so that the driver 7 may be caused to illuminate LED 9 at one of the seven levels described in the above displayed table. When the LED 9 is so activated, a light beam is focused on the active area of the detector 25 via the lens 21 and the elongated tube 23. Then, via the connection 27, operational amplifier 29, connection 31 and analog-to-digital converter 16, the microcomputer 5 receives signals which are indicative of not only the position of the beam of light on the active area of the position sensing detector 25, but are also indicative of the intensity of light impinging on the active areas of the position sensing detector 25. In this way, through the use of the circuit illustrated in FIG. 23, it is possible to keep an almost constant light intensity on the PSD and thereby an improved signal to noise ratio. The user may determine whether the user's line-of-sight is aiming away from the display screen 15 or whether there is some malfunction in the system.

The teachings of the present invention may be applied in many diverse areas of technology. For example, the teachings of the present invention could be used in a flight simulator where the direction where a pilot is looking may be used to cause various resulting alterations in simulated scenery, alarm status or other aspects. Furthermore, in the case of the embodiment illustrated in FIGS. 2 and 16, in particular, the moveable unit may be provided with a battery which is either of the rechargeable type or one which includes a solar panel.

One important environment of contemplated use of the embodiments of the present invention lies in the environment of televisions and VCRs. In this regard, such devices are known to include menu modes which are displayed on the display screen of the television and which may be manipulated by a remote control device using an infrared link to cause preprogramming of VCR tape recording, program watching and the like. The present invention is ideal in such an environment of use since either through switching via a predetermined time period or through the use of a push button, different modes may be accessed after the cursor on the display screen is moved to the desired region or location by moving the head of the user or other body part to which the camera unit is affixed.

Further, in this regard, the embodiment of the present invention illustrated in FIGS. 2 and 16, namely the wireless unit, may be incorporated into a standard infrared controller system. This will allow sharing of certain elements and therefore will result in cost reduction. In the remote unit of the invention of FIGS. 2 and 16, the following items already exist in a standard infrared controller:

The microprocessor, driver, second LED and the battery. Many buttons exist on standard infrared remote controllers which may be used through a switching mechanism to activate aspects of the present invention.

Furthermore, in existing television sets which utilize an infrared controller, the following items already exist within the television set housing:

The photodetector, the buffer, the microcomputer, the power supply and the cursor control circuit. From this, it should be understood that the present invention is easily adaptable to existing television sets through minor modifications thereto in accordance with the teachings of the present invention.

As such, an invention has been disclosed in terms of a preferred embodiment thereof which fulfills each and every one of the objects of the invention as set forth hereinabove and provides a new and improved optical pointing device of great utility.

Of course, various changes, modifications and alterations in the teachings of the present invention may be contemplated by those skilled in the art without departing from the intended spirit and scope of the present invention. As such, it is intended that the present invention only be limited by the terms of the appended claims.

I claim:

1. An optical pointing device for use within a prescribed space and adapted to be interconnected into a display device having a display screen, a cursor movably displayed on said display screen and a cursor control circuit which controls the position of said cursor on said display screen, said optical pointing device comprising:
    a) a first unit including a single light source and computer means for controlling operation of said light source, said first unit being fixedly located in adjacency to said display device with said computer means connected to said cursor control circuit;
    b) a second unit moveably contained within said space, said space including a region defined by a substantially conical shape having an angle of diversion of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface;
    c) transmission means for transmitting signals related to said currents to said computer means, said computer means receiving said signals and, responsive thereto, activating said cursor control circuit to move said cursor substantially in alignment with said alignment axis;
    d) said device being operable to move said cursor to substantially any location on said display screen responsive to translational and/or rotational movements of said light detector means anywhere within said region.

2. The invention of claim 1, further including an operational amplifier interposed between said light detector means and said computer means for amplifying said currents and translating them into proportional voltages.

3. The invention of claim 1, wherein said light source is mounted above said display and said computer means is located in a separate location adjacent said display device.

4. The invention of claim 1, wherein said optical pointing device includes an activation button for activating and deactivating thereof.

5. The invention of claim 4, wherein said activation button is mounted on said second unit.

6. The invention of claim 1, wherein said light source comprises a light emitting diode and a driver connected thereto and controlled by said computer means.

7. The invention of claim 1, further including an analog-to-digital convertor converter interposed between said light detector means and said computer means to provide said computer means with digital signals related to said currents.

8. The invention of claim 1, wherein said light detector means comprises an elongated tube surrounding said alignment axis, a lens at a forward end of said tube and said light sensitive surface at a rearward end of said tube.

9. The invention of claim 1, wherein said second unit is attached to the hand of a user of said device.

10. The invention of claim 1, wherein said transmission means comprises an electrical conductor connected between said light detector means and said computer means.

11. The invention of claim 1, wherein said transmission means comprises:

a) further computer means in said second unit for receiving said currents,
b) a further light source driven by said further computer means; and
c) further light detector means connected to said first mentioned computer means for receiving light signals from said further light source.

12. The invention of claim 11, wherein said transmission means further includes a buffer and an analog-to-digital converter interposed between said further light detector means and said computer means.

13. The invention of claim 11, wherein said second unit is incorporated into a remote control unit of said display device, said further light source and said further light detector means combining to form an infrared light data link.

14. The invention of claim 13, wherein said display device comprises a television.

15. The invention of claim 11, wherein active dynamic gain control means is provided for sensing the intensity of light received by said further light detector means and, responsive thereto, adjusting the intensity of light emitted by said first mentioned light source.

16. The invention of claim 11, wherein said computer means and further computer means communicate with one another via said light source and light detector means, on one hand, and via said further light source and further light detector means on the other hand.

17. The invention of claim 14, wherein a VCR is associated with said television.

18. The invention of claim 1, wherein said region extends outwardly from said light source conically at an angle of divergence of at least 180 degrees and for a distance of 10 meters.

* * * * *

REEXAMINATION CERTIFICATE (2956th)

United States Patent [19]

Hansen

[11] B1 5,045,843

[45] Certificate Issued Jul. 16, 1996

[54] OPTICAL POINTING DEVICE

[75] Inventor: Per K. Hansen, Burlington, Vt.

[73] Assignee: Selectech Ltd., Colchester, Vt.

Reexamination Request:
No. 90/003,214, Oct. 6, 1993

Reexamination Certificate for:
Patent No.: 5,045,843
Issued: Sep. 3, 1991
Appl. No.: 280,509
Filed: Dec. 6, 1988

[51] Int. Cl.⁶ .................................................. G09G 5/08
[52] U.S. Cl. ........................ 345/158; 345/180; 348/734; 359/142
[58] Field of Search ........................ 345/158, 157, 345/156, 180, 181, 182, 183; 348/734; 359/142; 356/4, 375

[56] References Cited

U.S. PATENT DOCUMENTS

| | | |
|---|---|---|
| 3,678,283 | 7/1972 | LawBaw . |
| 3,706,493 | 12/1972 | Redmann . |
| 3,727,055 | 4/1973 | David et al. . |
| 3,815,994 | 6/1974 | Peckham ................ 356/4 |
| 3,907,434 | 9/1975 | Coles . |
| 4,123,165 | 10/1978 | Brown et al. . |
| 4,209,255 | 6/1980 | Heynau et al. . |
| 4,320,462 | 3/1982 | Lund et al. . |
| 4,396,945 | 8/1983 | Dimatteo et al. . |
| 4,506,354 | 3/1985 | Hansen . |
| 4,565,999 | 1/1986 | King et al. . |
| 4,576,481 | 3/1986 | Hansen . |
| 4,622,644 | 11/1986 | Hansen . |
| 4,626,892 | 12/1986 | Nortrup et al. . |
| 4,641,205 | 2/1987 | Beyers, Jr. ................ 358/335 |
| 4,642,786 | 2/1987 | Hansen . |
| 4,653,102 | 3/1987 | Hansen . |
| 4,660,981 | 4/1987 | Stridsberg . |
| 4,684,249 | 8/1987 | Ellis . |
| 4,701,047 | 10/1987 | Eibert et al. . |
| 4,745,402 | 5/1988 | Auerbach . |
| 4,776,016 | 10/1988 | Hansen . |
| 4,796,019 | 1/1989 | Auerbach . |
| 4,823,170 | 4/1989 | Hansen . |
| 4,855,725 | 8/1989 | Fernandez . |
| 4,858,203 | 8/1989 | Hansen . |
| 4,923,303 | 5/1990 | Lutz . |
| 4,924,216 | 5/1990 | Leung ................ 345/158 |

FOREIGN PATENT DOCUMENTS

| | | |
|---|---|---|
| 209411 | 1/1987 | France . |
| 62-52631 | 3/1987 | Japan . |
| 88/04060 | 6/1988 | WIPO . |

*Primary Examiner*—Richard A. Hjerpe
*Attorney, Agent, or Firm*—H. Jay Spiegel; Jacobson, Price, Holman & Stern

[57] ABSTRACT

The present invention relates to an optical pointing device which preferably uses infrared light as a source and a camera as a detector. Movements of the camera with respect to the light source which remains fixed are sensed in the detector portion of the camera to determine the direction in which the camera is pointing with respect to, for example, a display screen adjacent the light source. The electronics included in the present invention are designed to act, responsive to sensing of the position of the camera with respect to the light source to cause corresponding movements of a cursor on the display screen. Other modes of operation of the present invention are also disclosed.

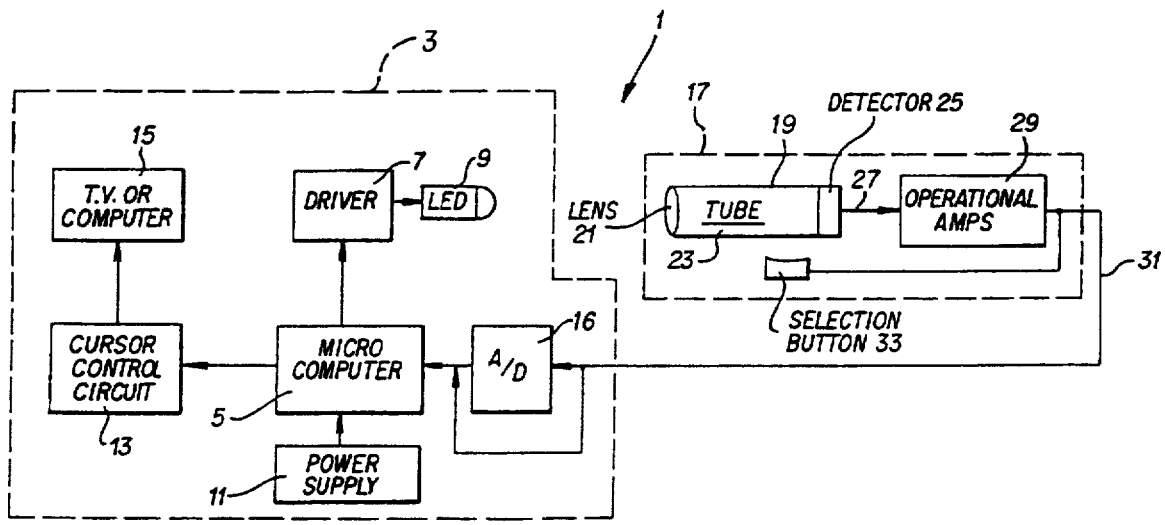

B1 5,045,843

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 12 and 15 are determined to be patentable as amended.

Claims 2-6, 8-11, 13-14 and 16-18, dependent on an amended claim, are determined to be patentable.

New claims 19-27 are added and determined to be patentable.

1. An optical pointing device for use within a prescribed space and adapted to be interconnected into a display device having a display screen, a cursor movably displayed on said display screen and a cursor control circuit which controls the position of said cursor on said display screen, said optical pointing device comprising:

[a)] a first unit including a single light source and computer means for controlling operation of said light source, said first unit being fixedly located in adjacency to said display device with said computer means connected to said cursor control circuit;

[b)] a second unit moveably contained within said space, said space including a region defined by a substantially conical shape having an angle of [diversion] *divergence* of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface, *all angular, rotative and/or translational relationship measurements being made responsive to receipt of light by said light detector means*;

[c)] *light* transmission means *solely* for transmitting *light* signals related to said currents to said computer means, said computer means *comprising means for* receiving said *light* signals and, responsive thereto, activating said cursor control circuit to move said cursor substantially in alignment with said alignment axis;

[d)] said device being operable to move said cursor to substantially any location on said display screen responsive to translational and/or rotational movements of said light detector means anywhere within said region.

7. The invention of claim 1, further including an analog-to-digital [convertor] *converter* interposed between said light detector means and said computer means to provide said computer means with digital signals related to said currents.

12. The invention of claim 11, wherein said [transmission means] *first unit* further includes a buffer and an analog-to-digital converter interposed between said further light detector means and said computer means.

15. [The invention of claim 11,] *An optical pointing device for use within a prescribed space and adapted to be interconnected into a display device having a display screen, a cursor movably displayed on said display screen and a cursor control circuit which controls the position of said cursor on said display screen, said optical pointing device comprising:*

*a first unit including a single light source and computer means for controlling operation of said light source, said first unit being fixedly located in adjacency to said display device with said computer means connected to said cursor control circuit;*

*a second unit moveably contained within said space, said space including a region defined by a substantially conical shape having an angle of divergence of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface, all angular, rotative and/or translational relationship measurements being made responsive to receipt of light by said light detector means, said second unit comprising further computer means;*

*transmission means in said second unit comprising a further light source driven by said further computer means solely for transmitting light signals related to said currents to said computer means;*

*said first unit further comprising further light detector means connected to said computer means for receiving the light signals from the further light source, said computer means receiving said signals and, responsive thereto, activating said cursor control circuit to move said cursor substantially in alignment with said alignment axis;* wherein active dynamic gain control means is provided for sensing the intensity of light received by said further light detector means and, responsive thereto, adjusting the intensity of light omitted by said [first mentioned] light source *of said first unit*;

*said device being operable to move said cursor to substantially any location on said display screen responsive to translational and/or rotational movements of said light detector means anywhere within said region.*

*19. The optical pointing device of claim 1, wherein the light detector means of the second unit generates said signals which are indicative of the relative distance between the first unit and the second unit responsive to the intensity of light received by said light detector means of the second unit.*

*20. The optical pointing device of claim 1, wherein the first unit comprises light detector means and the transmission means comprises a light source for transmitting light signals to the light detector means of the first unit, said light detector means of the first unit generating said signals which are indicative of the relative distance between the first unit and the second unit responsive to the intensity of light received by said light detector means of the second unit.*

20. The optical pointing device of claim 1, wherein the first unit comprises light detector means and the transmission means comprises a light source for transmitting light signals to the light detector means of the first unit, said light detector means of the first unit generating saaid signals which are indicative of the relative distance between the first unit and the second unit responsive to the intensity of light received by said light detector means of the first unit.

21. The invention of claim 1, further including active dynamic gain control means responsive to signals which are indicative of a relative distance between the first unit and the second unit and, responsive thereto, adjusting the intensity of light emitted by said light source of said first unit.

22. An optical pointing device for use within a prescribed space and adapted to be interconnected into a display device having a display screen, a cursor movably displayed on said display screen and a cursor control circuit which controls the position of said cursor on said display screen, said optical pointing device comprising:

a first unit including a single light source and computer means for controlling operation of said light source, said first unit being fixedly located in adjacency to said display device with said computer means connected to said cursor control circuit;

a second unit moveably contained within said space, said space including a region defined by a substantially conical shape having an angle of divergence of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface, all angular, rotative and/or translational relationship measurements being made responsive to receipt of light by said light detector means, said second unit comprising further computer means;

transmission means in said second unit comprising a further light source driven by said further computer means solely for transmitting light signals related to said currents to said computer means;

said first unit further comprising further light detector means connected to said computer means for receiving the light signals from the further light source, said computer means receiving said signals and, responsive thereto, activating said cursor control circuit to move said cursor substantially in alignment with said alignment axis;

said device being operable to move said cursor to substantially any location on said display screen responsive to translational and/or rotational movements of said light detector means anywhere within said region.

23. The optical pointing device of claim 22, further including active dynamic gain control means for sensing intensity of light received by said light detector means and, responsive thereto, adjusting intensity of light emitted by said single light source of said first unit.

24. An optical pointing device for use within a prescribed space and adapted to be interconnected into a display device having a display screen, a cursor movably displayed on said display screen and a cursor control circuit which controls the position of said cursor on said display screen, said optical pointing device comprising:

a first unit including a single light source and computer means for controlling operation of said light source, said first unit being fixedly located in adjacency to said display device with said computer means connected to said cursor control circuit;

a second unit moveably contained within said space, said space including a region defined by a substantially conical shape having an angle of divergence of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface, all angular, rotative and/or translational relationship meansurements being made responsive to receipt of light by said light detector means, said second unit comprising control means;

transmission means in said second unit comprising a further light source driven by said control means solely for transmitting light signals related to said currents to said first unit;

said first unit further comprising further light detector means connected to said computer means for receiving the light signals from the further light source, said computer means receiving said signals and, responsive thereto, activating said cursor control circuit to move said cursor substantially in alignment with said alignment axis;

the computer means of the first unit and the control means of the second unit being responsive to each other so as to coordinate the transmission of light signals in both directions between the first unit and the second unit for automatically and periodically updating the angular rotative and/or translational relationship of the light detector means of the second unit with respect to the first unit to move said cursor to substantially any location on said display screen responsive to translational and/or rotational movements of said light detector means anywhere within said region.

25. The optical pointing device of claim 24, further including active dynamic gain control means for sensing intensity of light received by said light detector means and, responsive thereto, adjusting intensity of light emitted by said single light source of said first unit.

26. An optical pointing device for use within a prescribed space and adapted to be interconnected into a display device having a display screen, a cursor movably displayed on said display screen and a cursor control circuit which controls the position of said cursor on said display screen, said optical pointing device comprising:

a first unit including a single light source and computer means for controlling operation of said light source, said first unit being fixedly located in adjacency to said display device with said computer means connected to said cursor control circuit;

a second unit moveably contained within said space, said space including a region defined by a substantially conical shape having an angle of divergence of at least 20°, said region extending a finite distance from said display screen along an axis substantially perpendicular to said display screen, said second unit comprising light detector means for detecting light emitted from said light source and, responsive thereto, for generating currents related to the angular rotative and/or translational relationship between said light source and said light detector means, said light detector means including a light sensitive surface and an alignment axis substantially perpendicular to said light sensitive surface, all angular, rotative and/or translational relationship measurements being made responsive to receipt of light by said light detector means, said second unit comprising control means;

transmission means in said second unit comprising a further light source driven by said control means solely for transmitting light signals related to said currents to said first unit;

said first unit further comprising further light detector means connected to said computer means for receiving the light signals from the further light source, said computer means receiving said signals and, responsive thereto, activating said cursor control circuit to move said cursor substantially in alignment with said alignment axis; and means for coordinating the transmissions of light signals between the first unit and the second unit, said means for coordinating comprising:

said computer means of the first unit which controls the first light source to emit pulses of light which are received by the light detector of the second unit;

said control means of the second unit which is responsive to the positioning light pulses detected by the light detector means to thereafter drive the further light source of the second unit to transmit light signals related to said currents to said further light detector means of the first unit;

said computer means of the first unit which is responsive to the light signals received by the further light detector means to generate signals to move said cursor to substantially any location on said display screen; and wherein the computer means of the first unit and the control means of the second unit being responsive to each other for automatically and periodically updating the angular rotative and/or translational relationship of the light detector means of the second unit with respect to the first unit to move said cursor to substantially any location on said display screen responsive to translational and/or rotational movements of said light detector means anywhere within said region.

27. The optical pointing device of claim 26, further including active dynamic gain control means for sensing intensity of light received by said light detector means and, responsive thereto, adjusting intensity of light emitted by said single light source of said first unit.

* * * * *